United States Patent [19]
Cain et al.

[11] Patent Number: 5,385,744
[45] Date of Patent: Jan. 31, 1995

[54] CHOCOLATE-ENCAPSULATED FILLINGS

[75] Inventors: Frederick W. Cain, Voorburg; Adrian D. Hughes, 's-Gravenhage, both of Netherlands; Geoffrey Talbot, Kempston, Great Britain

[73] Assignee: Van Den Bergh Foods Co., Division of Conopco Inc., Lisle, Ill.

[21] Appl. No.: 907,360

[22] Filed: Jul. 1, 1992

[30] Foreign Application Priority Data

Jul. 3, 1991 [EP] European Pat. Off. ............ 91306027
Jul. 17, 1991 [GB] United Kingdom ................. 9115421

[51] Int. Cl.$^6$ ............................................... A23G 3/00
[52] U.S. Cl. ........................................ 426/89; 426/93; 426/98; 426/103; 426/306; 426/606
[58] Field of Search ................... 426/607, 660, 89, 94, 426/103, 302, 306, 321, 334, 631, 601, 610, 606, 98

[56] References Cited

U.S. PATENT DOCUMENTS

| | | |
|---|---|---|
| 2,975,063 | 3/1961 | Paul et al. . |
| 2,979,407 | 4/1961 | Duck . |
| 3,012,890 | 12/1961 | Dutton et al. . |
| 3,491,677 | 8/1970 | Bracco . |
| 4,157,405 | 6/1979 | Yasuda et al. . |
| 4,199,611 | 4/1980 | Toyoshima et al. . |
| 4,208,445 | 6/1980 | Cottier et al. . |
| 4,234,618 | 11/1980 | Jasko et al. . |
| 4,268,534 | 5/1981 | Kawada et al. . |
| 4,276,322 | 6/1981 | Padley et al. . |
| 4,348,423 | 9/1982 | Pairaud et al. . |
| 4,486,457 | 12/1984 | Schijf et al. . |
| 4,491,597 | 1/1985 | Varvil et al. ............. 426/660 |
| 4,524,086 | 6/1985 | Player et al. ............. 426/607 |
| 4,533,561 | 8/1985 | Ward . |
| 4,613,514 | 9/1986 | Maruzeni et al. . |
| 4,726,959 | 2/1988 | Momura et al. ............. 426/660 |
| 4,839,192 | 6/1989 | Sagi et al. . |
| 4,861,611 | 8/1989 | Baba et al. . |
| 4,873,109 | 10/1989 | Tanaka et al. . |
| 4,882,192 | 11/1989 | Maeda et al. . |
| 4,888,196 | 12/1989 | Ehrman et al. . |
| 4,895,732 | 1/1990 | Suwa et al. ............. 426/610 |
| 4,902,527 | 2/1990 | Galenkamp et al. . |
| 5,023,102 | 6/1991 | Given, Jr. ............. 426/660 |
| 5,023,106 | 6/1991 | Ehrman et al. . |
| 5,066,510 | 11/1991 | Ehrman et al. . |
| 5,135,769 | 8/1992 | Itagaki et al. . |

FOREIGN PATENT DOCUMENTS

| | | |
|---|---|---|
| 1234683 | 9/1983 | Australia . |
| 196210 | 10/1986 | European Pat. Off. . |
| 285422 | 10/1988 | European Pat. Off. . |
| 354025 | 2/1990 | European Pat. Off. . |
| 1437781 | 4/1976 | United Kingdom . |
| 2168071 | 6/1986 | United Kingdom . |

OTHER PUBLICATIONS

Abstract of JP 46026824, Published in 1971 Through Derwent Abstracts.
Derwent Abstract of SU 665,885. Published in 1980.
Patton, S. et al., "Biomedical Aspects of Lactation", (1976) pp. 78–84.

*Primary Examiner*—Donald E. Czaja
*Assistant Examiner*—Anthony Weier
*Attorney, Agent, or Firm*—Cushman, Darby & Cushman

[57] ABSTRACT

The presence of a specific ($H_2M+HM_2$)-fat, either in the filling or in the coating of encapsulated fillings, results in the retardation of bloom of the chocolate composition. Therefore, the invention is concerned with encapsulated fillings, wherein the coatings display a defined ($H_2M+HM_2$)-content. A process of preparing these encapsulated products is also included. Encapsulated products are, e.g., chocolates, pralines, biscuits, cookies, toffees, fried snacks or cakes.

10 Claims, No Drawings

CHOCOLATE-ENCAPSULATED FILLINGS

Chocolate-encapsulated fillings consisting of at least a filling and a chocolate coating, wherein the filling comprises conventional filling ingredients, such as sugar, skimmed milk powder, salt or emulsifier and at least 35 wt. % of a filling fat, are well-known products. So far, however, these products have displayed a big disadvantage, in particular when the filling is liquid, i.e. fat present in the liquid filling migrates into the coating layer. Because of this migration, blooming of the chocolate occurs.

In order to overcome this problem, a solution was sought in the use of an intermediate layer between the liquid filling and the coating. However, such an extra layer complicates the production process and often has a negative influence on the mouthfeel of the product.

Therefore, we have conducted a study in order to find out whether it is possible to avoid the necessity of such an extra layer while the product properties are as good or even better.

PRIOR ART

From U.S. Pat. No. 2,979,407 stabilizing ingredients for solid chocolate materials or chocolate-coated products are known that are included in the chocolate in amounts of 0.5–5 wt. %. The stabilizing ingredients consist of triglycerides of lauric, myristic and palmitic acid, preferably in molar ratios of 2.0:1.2:2.0. Minor amounts of other fatty acids do not change the basic character of the ingredients. The ingredients are used to stabilize the colour of chocolate upon storage. Because of the very strict requirements set to the fatty acid components of the triglycerides that may be used, these products have never been applied commercially.

From U.S. Pat. No. 3,491,677 it is further known that bloom formation can be inhibited by utilization of fatty compositions that are mixtures of natural interesterified triglycerides comprising short-chain fatty acids and long-chain fatty acids while the iodine value (=I.V.) of the compounds is 30–55 and the melting point is low. As a consequence of the above-mentioned requirements, only a limited range of triglycerides could be applied while the low melting point may create problems as regards the properties of the chocolate composition.

From EP 390,408 triglyceride compositions are known that contain high levels (at least 85%) of combined MLM and MML (M=saturated fatty acid $C_8$–$C_{10}$; L=saturated fatty acid $C_{20}$–$C_{24}$) and low levels (i.e. at most 10 wt. %) of triglycerides LLM and LML (combined). These fats should always contain $C_8$ and $C_{10}$ fatty acid residues (35–60 wt. %) in a ratio of 1:4 to 4:1, while also 35–60 wt. % of behenic acid should be present. Minor amounts of $C_{12}$–$C_{18}$ fatty acids can be present in the fats.

The fat phase comprising the above-mentioned triglycerides should contain less than 20 wt. % of cocoa butter (i.e. less than 15 wt. % of SUS; S=saturated $C_{16}$/$C_{18}$; U=oleic). The triglycerides are applied in order to reduce the caloric value of compositions normally containing cocoa butter by replacing cocoa butter by these mixed triglycerides.

THE INVENTION

We have now found that the problems associated with the application of the prior art products can be solved by using a specific hardstock fat in the encapsulated filling. Therefore, our invention is concerned with chocolate-encapsulated fillings consisting of at least a filling and a chocolate coating, wherein the filling comprises conventional filling ingredients and at least some amount, preferably at least 10 wt. %, more preferably at least 35 wt. %, of a filling fat, including optionally hardstock components, which products are characterized by the presence of such an amount of an ($H_2M+HM_2$)-fat having a stearic acid content of at least 5 wt. % and preferably having an iodine value of less than 20 as hardstock in the encapsulated product that the coatings display an ($H_2M+HM_2$)-content after storage for 10 weeks at 20° C. of at least 0.5 wt. % and an SOS content of at least 15 wt. %, in which:

H means saturated fatty acid with $\geq C_{16}$, preferably $C_{16}$/$C_{18}$;

M means saturated fatty acid with $C_8$/$C_{14}$, preferably $C_{12}$–$C_{14}$;

S means saturated fatty acid with $C_{16}$/$C_{18}$;

O means oleic acid.

The stearic acid content of the hardstock is preferably at least 20 wt. % and its iodine value is preferably less than 5.0.

The above-mentioned requirement of at least 0.5% ($H_2M+HM_2$) in the coating after storage for 10 weeks at 20° C. can be fulfilled in two ways:

Firstly, lauric fat ($=HM_2+H_2M$ fat) can be added to the chocolate composition that is used for the coating.

Secondly, this lauric fat can be added to the filling as part of the fat phase of the filling.

Upon storage, the lauric fat migrates from the filling into the coating where it affects its bloom-retarding effect.

It should be emphasized here that the storage requirement of 10 weeks at 20° C. is a minimum requirement, meaning that, in addition to this storage, any other treatment, such as storage at other temperatures, is permitted.

In both cases, products are obtained that have an increased resistance to blooming. An additional benefit of the presence of the hardstocks might be that it might prevent the migration of other fats from the more liquid part of the composition.

Suitable fillings that can be encapsulated are chocolate fillings, praline fillings, biscuits, cookies, toffees, fried food products, cakes etc. All these fillings contain some fat; however, preferred amounts are at least 10 wt. %, and in particular at least 35 wt. %, of a filling fat.

The best results are obtained when the ($H_2M+HM_2$) content in the coating after 10 weeks' storage at 20° C. is at least 0.6 wt. % preferably 0.6–12 wt. %.

As has been set out above, the ($H_2M+HM_2$)-containing hardstock can be part of the fat phase of the filling, in which case its concentration is at least 0.5 wt. %, preferably 0.5–25 wt. % (based on the filling), or it can be part of the coating, in which case its concentration is at least 0.5 wt. %, based on the total coating. Of course, it is also possible to distribute the hard fat over the filling and the coating.

As hard fat component containing ($H_2M+HM_2$), interesterified mixtures of vegetable oils high in triglycerides with fatty acid residues with at least 16 C atoms but containing at least 5 wt. % of stearic acid and triglycerides rich in lauric and/or myristic acid residues can be used advantageously. Examples of such fat mixtures are mentioned in, e.g., our Australian patent application 12346/83, Ser. Nr. 549,465.

In particular, interesterified mixtures of hardened palm oil and hardened palm kernel oil, such as an interesterified mixture of PO-58 and PK-39, are very suitable. Fractions of these products can also be used. For instance, the olein fraction of the wet fractionation of such an interesterified fat mixture also gives very satisfactory results.

The chocolate coating can be made of any kind of chocolate composition. So, plain chocolate and milk chocolate can both be used. The chocolate can also contain other ingredients, such as flavour, fruit components etc.

The filling can be chosen from the normal fillings that can be coated with a chocolate layer. Examples of such fillings are fillings for chocolates, bonbons or pralines, toffee fillings containing toffee fat, biscuits containing biscuit cream fat, roast nuts, such as roast hazelnuts or peanuts. However, cookies, fried food products, such as fried snacks, cakes etc. that are coated with a chocolate layer can also be considered as a filling.

A very convenient way to produce, e.g., chocolate-coated cookies or biscuits is by incorporating a ($H_2M + HM_2$) hardstock in a margarine or a shortening in order to use this fat composition for the baking of a product that can be enrobed with chocolate, whereupon the lauric fat migrates from the filling to the coating. The fried food products can advantageously be made by frying the food products in a frying oil containing the lauric fat and enrobing the fried products with chocolate, e.g. by dipping them in a liquid chocolate bath.

The invention also concerns a process for the production of the encapsulated fillings. The products are made in a conventional way; however, the ($H_2M + HM_2$)-containing hardstock is incorporated into the filling as part of the filling fat, whereupon the end products are obtained upon storage, during which the lauric fat component migrates to the coating.

It is, of course, also possible to add the lauric fat immediately to the chocolate composition from which the coating is made. However, this might give rise to problems with the viscosity or the melting behaviour of the chocolate composition.

Furthermore, our invention is concerned with the use of the lauric fat compositions in order to achieve retardation of bloom of the chocolate coating. In particular, the invention concerns the use of the lauric hardstock as component of the fat of fillings to be coated in order to achieve a migration of the lauric component to the chocolate coating upon storage.

The invention will now be illustrated by the following non-limiting Examples.

EXAMPLES

I. Three different fillings were made with the composition as mentioned in Tables 1 and 2.

TABLE 1

|  | wt. % |
|---|---|
| Peanut | 59.1 |
| Icing sugar | 20.4 |
| S.M.P. | 3.0 |
| Salt | 0.5 |
| Lecithin | 0.5 |
| Groundnut oil | 7.5 |
| Hardstock | 10.0 |
| Total fat | 50.0% |
| % Hardstock on fat | 20.0% |

TABLE 2

| Carbon number | Composition | | |
|---|---|---|---|
|  | HS-1 | HS-2 | HS-3 |
| C40 |  |  | 0.9 |
| C42 |  |  | 2.5 |
| C44 |  |  | 2.8 |
| C46 | 0.2 | 0.1 | 4.1 |
| C48 | 0.8 | 0.1 | 4.3 |
| C50 | 10.2 | 2.8 | 4.3 |
| C52 | 27.1 | 20.8 | 21.0 |
| C54 | 46.5 | 60.3 | 44.0 |
| C56 | 6.5 | 7.3 | 6.0 |
| C58 | 5.6 | 5.7 | 4.5 |
| C60 | 2.7 | 2.8 | 2.1 |

HS-1 being a stearin fraction of the fractionation of a trans-hardened, interesterified mixture of soybean oil and palm oil olein.
HS-2 being a shea stearin fraction.
HS-3 being a fat having a content ($H_2M + HM_2$) of about 70 wt. %, a carbon number distribution of $C_{30}$-$C_{38}$ : 4.1%; $C_{40}$: 4.1%; $C_{42}$: 9.8%; $C_{44}$: 12.5%; $C_{46}$: 21.4%; $C_{48}$: 23.0%; $C_{50}$: 10.6%; $C_{52}$: 9.0%; and $C_{54}$: 5.3%, while the FAME of this product was: $C_{12}$: 20.1%; $C_{14}$: 8.1%; $C_{16}$: 23.7%; $C_{18}$: 44.3%; $C_{18:1}$: 0.4%; $C_{18:2}$: 0.4% and others 3.0%. Its I.V. was 1.

The fillings were placed in dark chocolate coatings and stored at 20° C. and 23° C.

The carbon number analysis of the fat phase from the coatings was:

|  | wt. % |
|---|---|
| C48 | 0.5 |
| C50 | 18.0 |
| C52 | 45.8 |
| C54 | 33.7 |
| C56 | 1.8 |
| C58 | 0.3 |

The different products were evaluated for the occurrence of bloom by visualization and the chocolate coatings were analyzed for carbon numbers, giving a good indication that the ($H_2M + M_2H$) level was above 0.5 wt. %. The results based on the total fat are laid down in Tables 3 and 4.

TABLE 3

| | Occurrence of bloom (in weeks) | |
|---|---|---|
| Hardstock | Storage at 20° C. | Storage at 23° C. |
| 1 | 6 | 4 |
| 2 | 8 | 6 |
| 3 | 20 | 8 |

TABLE 4

Carbon number analysis of chocolate coating C40–C46

| | After 30 weeks at 20° C. | |
|---|---|---|
| Hardstock | Time = 0 | Time = 30 |
| 1 | 0.0 | 0.0 |
| 2 | 0.0 | 0.0 |
| 3 | 0.0 | 0.64 |

| | After 12 weeks at 23° C. | |
|---|---|---|
| Hardstock | Time = 0 | Time = 12 |
| 1 | 0.0 | 0.0 |
| 2 | 0.0 | 0.0 |
| 3 | 0.0 | 0.63 |

So, the use of hardstock-3 (i.e. an interesterified mixture of PO-58 and PK-39) gives an extended resistance to blooming as compared with the use of hardstocks free from ($H_2M + HM_2$, i.e. from TG with C40 to C46).

II. A chocolate powder (CP) was made with the composition:

| Icing sugar | 55 wt. % |
| --- | --- |
| Cocoa powder N11N | 20 wt. % |
| Cocoa butter | 25 wt. % |
| Lecithin | 0.4 wt. % |

| Sample I: | 95 wt. % of CP + 5% of cocoa butter equivalent (about 70 wt. % of SOS); |
| --- | --- |
| Sample II: | 95 wt. % of CP + 3%% of the same cocoa butter equivalent and 2% of a hardstock with I.V. = 1 and composition (in carbon numbers). |

| $C_{30}$–$C_{38}$ | 6.3 |
| --- | --- |
| $C_{40}$ | 5.7 |
| $C_{42}$ | 12.9 |
| $C_{44}$ | 13.7 |
| $C_{46}$ | 20.3 |
| $C_{48}$ | 21.3 |
| $C_{50}$ | 9.3 |
| $C_{52}$ | 7.3 |
| $C_{54}$ | 3.0 |

This meant therefore an ($H_2M+M_2H$) level in the hardstock of about 74 wt. %.

The chocolates were slab-tempered, the shells were moulded and filled with a peanut paste of the following composition:

| Wet-fractionated shea stearin | 9.1 wt. % |
| --- | --- |
| SMP | 3.3 wt. % |
| Peanut paste | 64.6 wt. % |
| Icing sugar | 22 wt. % |
| Salt | 0.5 wt. % |

The samples were stored at 25° C. After 1 month's storage at 25° C., followed by 10 weeks' stabilization at 20° C., the shells were analysed and evaluated.

| Sample | ($H_2M + M_2H$) on coating | Bloom score* |
| --- | --- | --- |
| 1 | trace | 2 |
| 2 | 0.7 | 5 |

*5 = perfect; 3 and lower = unacceptable

III. The filling as disclosed below was used. The recipe of the filling was:

| Icing sugar | 22.5 wt. % |
| --- | --- |
| Peanut paste | 64.6 wt. % |
| Salt | 0.5 wt. % |
| SMP | 3.3 wt. % |
| Fat | 9.1 wt. % |

Fillings were made, applying different fats according to the following scheme:
1. Fat is the hardstock of Example II
2. Fat is shea stearin
3. Fat is groundnut oil
4. Fat is an olein fraction of an ($H_2M+M_2H$) fat with I.V. <3 and the following composition:

| $C_{30}$–$C_{38}$ | 43.4 |
| --- | --- |
| $C_{40}$ | 13.6 |
| $C_{42}$ | 17.6 |
| $C_{44}$ | 9.8 |
| $C_{46}$ | 7.6 |
| $C_{48}$ | 5.0 |
| $C_{50}$ | 1.9 |
| $C_{52}$ | 1.1 |

5. Fat is palm kernel fat

These fillings were put into standard dark chocolate shells. The shells were analysed and evaluated after 10 weeks' storage at 20° C.

| Sample | ($H_2M + M_2H$) level (on coating) | Bloom score of shell |
| --- | --- | --- |
| 1 | 0.53 | 5 |
| 2 | trace | 3 |
| 3 | trace | 2 |
| 4 | 0.7 | 5 |
| 5 | 0.1 | 2 |

IV. A hazelnut paste was made with the following composition:

| Cocoa powder 10/12 | 5 wt. % |
| --- | --- |
| Palm oil olein | 16.9 wt. % |
| SMP | 7 wt. % |
| Hazelnut paste (= blend of crushed hazelnut and icing sugar 1:1) | 36 wt. % |
| Icing sugar | 28 wt. % |
| Lecithin | 0.4 wt. % |
| Fat | 6.7 wt. % |

Different fats were added to the hazelnut paste. The fillings were placed in standard dark chocolate shells and stored at 13° C. for 3 months, followed by 10 weeks' storage at 20° C.

The following fats were used in the fillings:
1. Palm oil olein
2. The hardstock of Example II
3. An interesterified mixture of 70% palm kernel olein-42 and palm oil-58 with an I.V.<3 and the following carbon numbers:

| $C_{30}$–$C_{38}$ | 17.9 |
| --- | --- |
| $C_{40}$ | 10.1 |
| $C_{42}$ | 15.5 |
| $C_{44}$ | 11.8 |
| $C_{46}$ | 14.1 |
| $C_{48}$ | 13.8 |
| $C_{50}$ | 6.3 |
| $C_{52}$ | 5.7 |
| $C_{54}$ | 3.2 |

4. The ($H_2M+M_2H$) olein fraction of Example III, 4.

The shells were analysed and evaluated after storage for 3 months at 13° C. and 10 weeks at 20° C.:

| Sample | ($H_2M + M_2H$) level (on coating) | Bloom score of shell |
| --- | --- | --- |
| 1 | trace | 2 |
| 2 | 0.63 | 5 |
| 3 | 0.5 | 4/5 |
| 4 | 0.59 | 4/5 |

V. A peanut paste having the composition given below was applied. Different fats were added to this paste (see below). Fillings were made and placed in dark chocolate shells. These shells were stored at 20° C.

| | |
|---|---|
| Cocoa powder 10/12: | 5 wt. % |
| Palm oil olein | 22.2 wt. % |
| SMP | 7 wt. % |
| Peanut paste | 15 wt. % |
| Icing sugar | 43 wt. % |
| Lecithin | 0.4 wt. % |
| Salt | 0.1 wt. % |
| Fat | 7.8 wt. % |

The following fillings were made by using the fats mentioned below:
1. Groundnut oil
2. The hardstock of Example II
3. The interesterified mixture of Example IV, 3.
4. The olein fraction of Example III, 4.

The shells were analysed and evaluated after 3 months' storage at 20° C.

| Sample | ($H_2M + M_2H$) level (on coating) | Bloom score of shell |
|---|---|---|
| 1 | trace | 3 |
| 2 | 0.7 | 5 |
| 3 | 0.5 | 5 |
| 4 | 0.73 | 5 |

VI. Biscuits were made by using the following recipe:

| | |
|---|---|
| Fat | 29.75 wt. 5 |
| Water | 5.25 wt. % |
| Bastard sugar | 22.0 wt. % |
| Eggs | 2.0 wt. % |
| Flour | 41.0 wt. % |
| Salt | 0.3 wt. % |

After mixing the fat with water, the sugar, eggs, flour and salt were added to the mixture. The resulting dough was stored at 6° C. for 24 hours. The dough was rolled and cut into pieces of 1 cm×2.5 cm. The biscuits were baked at 175° C. for 20 minutes.

Two sets of biscuits were made, using the following fats:

Sample 1: Hardened palm oil olein-37/wet-fractionated palm oil olein 80/20 w/w
Sample 2: HS-3 (see Table 2)/wet-fractionated palm oil olein 25/75 w/w Both sets of biscuits were enrobed, using the chocolate composition: 95 wt. % of CP+5 wt. % of cocoa butter equivalent (having about 70% SOS).

The results are given below. The bloom was evaluated after storage at 25° C.

The ($H_2M + M_2H$) level of the coating was analysed after 10 weeks' storage at 20° C.

| Sample | Time taken to bloom at 25° C. storage | ($H_2M + M_2H$) level on coating |
|---|---|---|
| 1 | 4 weeks | trace |
| 2 | 8 weeks | 0.8 |

VII. Two sets of biscuits were made as set out in Example VI. The fat used in both cases was the fat of sample 1 of Example VI.

The biscuits were enrobed in the usual way, using the following compositions as chocolate:
Sample 1: 95 wt. % of CP+5 wt. % of cocoa butter equivalent (about 70% SOS)
Sample 2: 95 wt. % of CP+3 wt. 5 of the same CBE+2 wt. % of HS-3 (see Table 2).

The products were evaluated for the appearance of bloom after a 24 hours' cycle at 15/25° C. on storage.

The ($H_2M + M_2H$) level in the coating was analysed after 10 weeks at 20° C.

Results

| Sample | Time to bloom at 15/25° C. storage | ($H_2M + M_2H$) level on coating |
|---|---|---|
| 1 | 4 weeks | trace |
| 2 | 8 weeks | 0.92 |

We claim:

1. In a chocolate-encapsulated filling product comprising at least an edible filling and a chocolate coating, wherein the filling includes at least 10 wt. %, of a filling fat, the improvement wherein undesired blooming in the coating is minimized, said improvement comprising utilizing as part of the filling fat, an ($H_2M + HM_2$) hardstock fat which migrates from the filling into the coating, said ($H_2M + HM_2$) hardstock fat, having a stearic acid content of at least 5 wt. % and an iodine value of less than 20, and being present in an amount such that the coating displays an ($H_2M + HM_2$) hard stock content after storage for 10 weeks at 20° C. of at least 0.5 wt. % as a result of migration of said ($H_2M + HM_2$) hardstock fat from the filling, the coating initially having an SOS content of at least 15 wt. %, in which:
H means saturated fatty acid with $\geq C16$;
M means saturated fatty acid with C8–C14;
S means saturated fatty acid with C16–C18; and
O means oleic acid.

2. Encapsulated filling product according to claim 1, wherein the ($H_2M + HM_2$)-content in the coating after 10 weeks' storage at 20° C. is 0.6–1.2 wt. %.

3. Encapsulated filling product according to claim 1, wherein the ($H_2M + HM_2$)-content of a freshly prepared filling is 0.5–25 wt. % based on the filling.

4. Encapsulated filling product according to claim 1, wherein the ($H_2M + HM_2$) hardstock fat is an interesterified mixture of a vegetable oil high in triglycerides with fatty acid residues having at least 16 C atoms and a vegetable triglyceride comprising lauric, myristic or both fatty acid residues.

5. Encapsulated filling product according to claim 4, wherein the ($H_2M + HM_2$)-hardstock is an interesterified mixture of hardened palm oil and hardened palm kernel oil.

6. Encapsulated filling product according to claim 5, wherein the ($H_2M + HM_2$)-hardstock is an interesterified mixture of hardened palm oil, melting point 58° C., and hardened palm kernel oil melting point 39° C.

7. Encapsulated filling product according to claim 1, wherein the chocolate coating is made of plain chocolate or milk chocolate.

8. Encapsulated filling product according to claim 1, wherein the filling is selected from the group consisting of chocolate filling, praline filling, biscuits, cookies, toffees, fried food products and cakes.

9. Method for reducing the blooming of chocolate-encapsulated filling products on storage, wherein a hardstock fat with the composition according to claim 1 is incorporated into the filling in order to achieve migration of this hardstock fat to the chocolate coating upon storage.

10. A chocolate-encapsulated food product, selected from the group consisting of encapsulated chocolates, pralines, biscuits, cookies, toffees, fried food products, and cakes, wherein the chocolate coating of the encapsulated product, after storage for 10 weeks at 20° C., contains at least 0.5 wt. % of a ($H_2M + HM_2$) hardstock as defined in claim 1.

* * * * *